UNITED STATES PATENT OFFICE.

ALBERT WELLER, OF FRANKFORT-ON-THE-MAIN, GERMANY, ASSIGNOR TO VEREINIGTE CHININFABRIKEN, ZIMMER & CO., GESELLSCHAFT MIT BESCHRÄNKTER HAFTUNG, OF SAME PLACE.

TASTELESS QUININ COMPOUND.

SPECIFICATION forming part of Letters Patent No. 637,839, dated November 28, 1899.

Application filed October 27, 1899. Serial No. 734,973. (No specimens.)

*To all whom it may concern:*

Be it known that I, ALBERT WELLER, a subject of the Emperor of Germany, and a resident of Frankfort-on-the-Main, Germany, have invented certain new and useful Improvements in Pharmaceutical Products, of which the following is a specification.

This invention relates to a previous invention for which Patent No. 585,068, dated June 22, 1897, was obtained for the preparation of certain pharmaceutical preparations, being derivatives of the levogyrate alkaloids of the cinchona bark, crystallizing in tasteless white needles, soluble in water with difficulty, but readily in chloroform and acids, and having, when quinin is used, the following general formula:

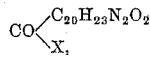

X representing a single haloid atom or an alkyloxy group. The said preparations may therefore be regarded as originating from the quinin carbonic acid, and the chlorocarbonylquinin, for example, may be described as "quinin carbonic chlorid," and the bodies containing an alkyloxy group as "quinin carbonic alkyl ether." I have now succeeded in obtaining a number of further bodies, which are also derivatives of the quinin or cinchonidin carbonic acid, and which, where quinin is employed, may be derived from the formula above stated, viz:

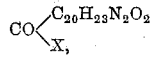

X signifying the residue of an amin base—as, for example, anilin or phenetidin. These new preparations are all white nearly tasteless powders, which very readily dissolve in alcohol, ether, chloroform, and benzene, but with great difficulty in water and ligroin. The salicylates of these bodies are very readily soluble in ether, and in this properly are sharply distinguished from the preparations described in the specification of the Patent No. 585,068, salicylates of which are insoluble in ether.

The novel bodies in question are particularly interesting, because they unite in themselves the good qualities of quinin with those of substances which possess themselves conspicuous antipyretic and antineuralgic action. The preparation may take place according to either of two methods—viz., by causing the cinchona alkaloids or their salts to act either upon substituted isocyanates or upon substituted carbonic chlorids.

The following are examples of methods according to this invention:

*Preparation of anilid of quinin carbonic acid, (phenylcarbamic ether of quinin.)*—Anhydrous quinin is heated, with slight excess of phenylic isocyanate, for a short time at 190° centigrade, dissolving to a brownish liquid, which on cooling solidifies to an amorphous mass. This is crushed fine and treated with dilute acid—for example, sulfuric acid—which dissolves the anilid of quinin carbonic acid produced according to the equation:

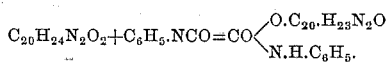

Alkalies precipitate it from acid solution as a white powder, which dissolves very readily in alcohol, ether, chloroform, and benzene, but is sparingly soluble in ligroin and water. The melting-point is not definite; but the compound is completely fused at about 100° centigrade. The preparation is tasteless, but a slightly bitter aftertaste is perceptible. Analysis gave:

Calculated for $CO\!\!<\!\!{}^{OC_{20}H_{23}N_2O}_{N.H.C_6H_5.}$    Found.

C=73.14 per cent.    72.86 per cent.
H= 6.54  "    "       6.69  "    "

The substance forms salts with acids, the salicylate being very readily soluble in ether.

*Preparation of phenetidid of quinincarbonic acid, (paraethoxyphenylcarbamic ether of quinin.)*—A solution of paraethoxyphenylcarbamic chlorid in benzene is first prepared by adding one molecular proportion of phosgene dissolved in benzene to a well-cooled solution of two molecular proportions of phenetidin in benzene. Paraethoxyphenylcarbamic chlorid is produced in accordance with the equation:

$$2C_6H_4(OC_2H_5)N.H_2 + COCl_2 = C_6H_4(O.C_2H_5)N.H.COCl + C_6H_4(OC_2H_5)NH_2HCl$$

and remains dissolved, while phenetidin hydrochlorid is precipitated. This is filtered, and to the filtrate are added two molecular proportions of quinin, which dissolves on warming and forms the required compound, according to the equation:

$$C_6H_4(OC_2H_5)NH.COCl + 2C_{20}H_{24}N_2O_2 = CO\begin{cases}OC_{20}H_{23}N_2O.\\NHC_6H_4OC_2H_5\end{cases} + C_{20}H_{24}N_2O_2.HCl.$$

The quinin hydrochlorid which is produced separates on cooling and is removed by filtration. The filtrate is agitated first with water and then with dilute acid—for example, sulfuric acid—which takes up the phenetidin. It can be precipitated from the acid solution by ammonia. It forms a white almost tasteless powder, which dissolves very readily in alcohol, ether, chloroform, and benzene, but very sparingly in ligroin and water. It is somewhat stable toward acids, but may be completely resolved into quinin and phenetidin by warm alcoholic caustic soda. Analysis gave:

Calculated for $CO\begin{cases}OC_{20}H_{23}N_2.O.\\N.HC_6H_4OC_2H_5.\end{cases}$   Found.

C = 71.46 per cent.   71.74 per cent.
H = 6.5 " "   6.55 " "

The compound forms salts with acids, of which the salicylate is remarkably soluble in ether. The other cinchona alkaloids behave just like quinin. As an example may be quoted the phenetidid of cinchonidin carbonic acid, which is obtained from cinchonidin in exactly the same way as the phenetidid of quinin carbonic acid is obtained from quinin.

The phenetidid of cinchonidin carbonic acid is a white crystalline tasteless powder, which forms salts and has the constitution:

$$CO\begin{cases}OC_{19}H_{21}N_2.\\NHC_6H_4OC_2H_5.\end{cases}$$

Analysis gave:

Calculated for $CO\begin{cases}OC_{19}H_{21}N_2\\NHC_6H_4.OC_2H_5.\end{cases}$   Found.

C = 73.52 per cent.   73.78 per cent.
H = 6.78 " "   7.02 " "

Having now particularly described and ascertained the nature of this invention and in what manner the same is to be formed, I declare what I claim is—

The new pharmaceutical products being derivatives of the alkaloids of the cinchona bark forming almost tasteless white powders, very readily soluble in alcohol, ether, chloroform and benzene but with difficulty in water and ligroin, whereof the salicylates are very readily soluble in ether, and having, when quinin is used the general formula:

$$CO\begin{cases}C_{20}H_{23}.N_2O_2\\X,\end{cases}$$

X representing the residue of an amin base, substantially as and for the purpose set forth.

In testimony whereof I have signed my name to this specification in the presence of two subscribing witnesses.

ALBERT WELLER.

Witnesses:
JEAN GRUND,
RICHARD GUENTHER.